(12) United States Patent
Jahagirdar et al.

(10) Patent No.: US 9,355,336 B1
(45) Date of Patent: May 31, 2016

(54) RECOGNIZING TEXT FROM FRAMES OF IMAGE DATA USING CONTEXTUAL INFORMATION

(71) Applicant: Amazon Technologies, Inc., Reno, NV (US)

(72) Inventors: Sonjeev Jahagirdar, Somerville, MA (US); Matthew Joseph Cole, Arlington, MA (US); David Paul Ramos, Cambridge, MA (US); Utkarsh Prateek, Natick, MA (US); Emilie Noelle McConville, Boston, MA (US); Ankur Datta, Cambridge, MA (US); Laura Varnum Finney, Seattle, WA (US); Yue Liu, Brighton, MA (US); Bhavesh Anil Doshi, Redmond, WA (US); Avnish Sikka, Acton, MA (US); Michael Vanne, Arlington, MA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 14/259,905

(22) Filed: Apr. 23, 2014

(51) Int. Cl.
 *G06K 9/00* (2006.01)
 *G06K 9/62* (2006.01)

(52) U.S. Cl.
 CPC .................. *G06K 9/6217* (2013.01)

(58) Field of Classification Search
 CPC .......................................................... G06K 9/00
 USPC .......................................................... 382/103
 See application file for complete search history.

(56) References Cited

U.S. PATENT DOCUMENTS

| | | | |
|---|---|---|---|
| 8,726,326 B1 * | 5/2014 | Harris | 725/113 |
| 8,755,604 B1 * | 6/2014 | Gross et al. | 382/181 |
| 2007/0118357 A1 * | 5/2007 | Kasravi et al. | 704/10 |
| 2011/0123115 A1 * | 5/2011 | Lee et al. | 382/185 |
| 2013/0108115 A1 * | 5/2013 | Hwang et al. | 382/106 |

FOREIGN PATENT DOCUMENTS

WO    WO 2013032639 A2 *  3/2013

* cited by examiner

*Primary Examiner* — Edward Park
*Assistant Examiner* — Molly Delaney
(74) *Attorney, Agent, or Firm* — Hogan Lovells US LLP

(57) ABSTRACT

Disclosed are techniques for recognizing text from one or more frames of image data using contextual information. In some implementations, image data including a captured textual item is processed to identify an entity in the image data. A context can be selected using the entity, where the context corresponds to a dictionary. Text in the captured textual item can be identified using the dictionary. The identified text can be output to a display device.

22 Claims, 5 Drawing Sheets

RECOGNIZING TEXT FROM FRAMES OF IMAGE DATA USING CONTEXTUAL INFORMATION

BACKGROUND

Optical Character Recognition (OCR) generally refers to the identification of text in sources such as digital photos or scanned images and output of the identified text into computer-encoded and computer-readable textual data. OCR can be used to digitize text appearing in images so the Optical Character Recognized (OCR'd) text can be stored in computer memory, edited, searched, displayed, and used in automated processes. For example, OCR can be used in pattern recognition, artificial intelligence and computer vision. OCR'd text from digital photos and video frames can have inaccuracies due to inherent limitations of conventional OCR processes and due to problems with input image data such as lack of focus and contrast, incomplete textual strings, and other flaws of an image captured using a modern device. OCR inaccuracies can result in additional errors when attempting to perform processes on the OCR'd text such as machine translation, text-to-speech, key data extraction and text mining.

DETAILED DESCRIPTION

Figure 1:
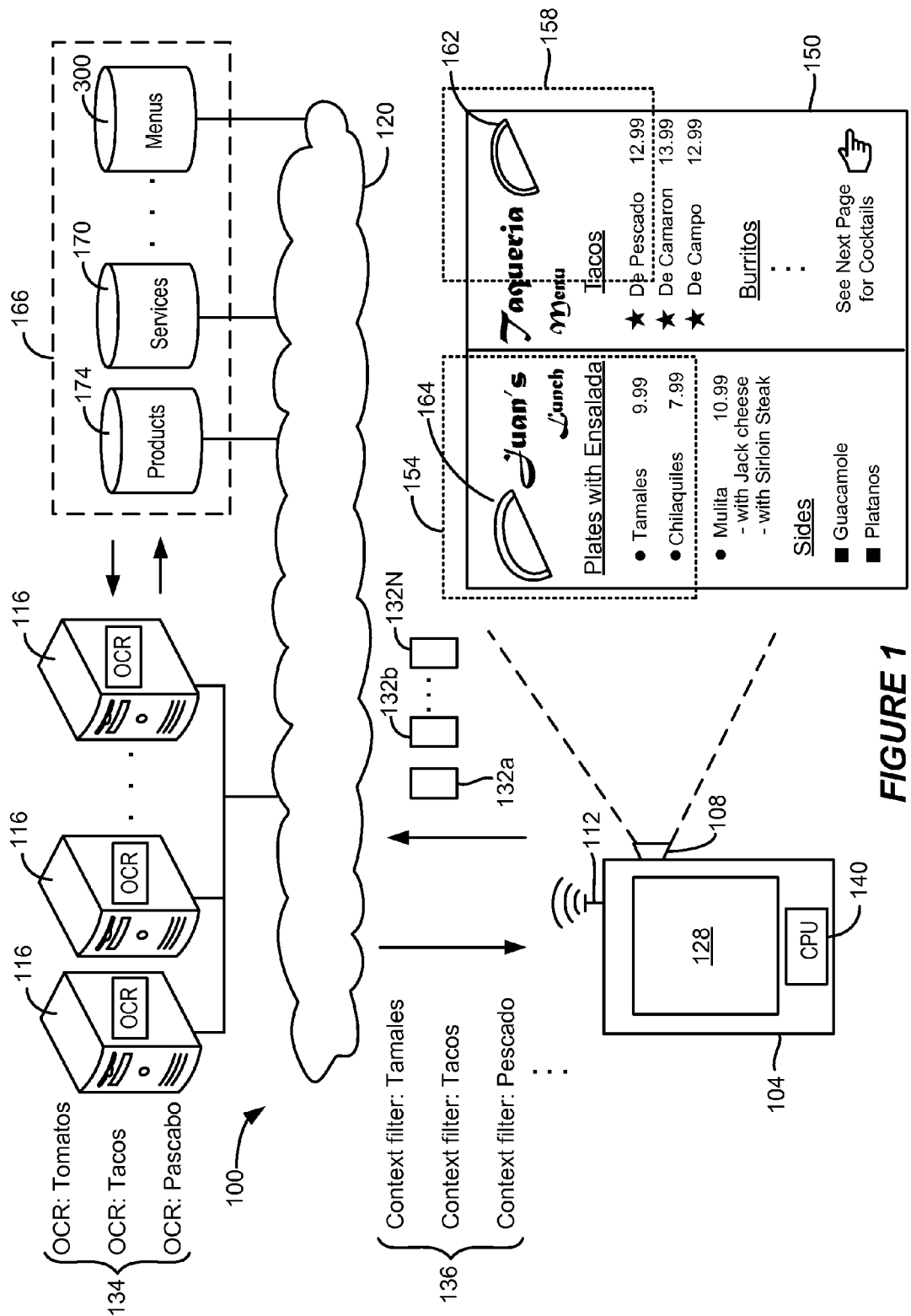
FIG. 1 shows an example of a system 100 in which text in frames of image data can be recognized using contextual information, according to some implementations.

This disclosure describes techniques for improving accuracy of identification of text in frames of image data in conjunction with techniques such as Optical Character Recognition (OCR). For example, a camera-enabled smartphone can capture a scene or an item in a scene in a digital photo. One or more entities in the digital photo can be used to identify a context for the scene, for instance, by performing scene categorization such as product matching. By way of illustration, a context can be in the form of a type of object (e.g., a menu, a billboard, a sign, or a product), a menu for a certain type of cuisine, a menu for a specific restaurant, a type of product, a specific product, a category of home appliances, or a page of a specific edition of a paperback novel. When a context is identified, a context-specific dictionary having a smaller and more relevant set of words than general language dictionaries can be accessed. The context-specific dictionary can be used to more accurately recognize text in the digital photo. By determining a context of the scene and using a context-specific dictionary, more relevant and accurate results can be obtained than those provided by conventional OCR processes.

In some implementations, text recognition results can be enhanced by processing additional frames of image data. In addition, in some implementations, after performing OCR to identify text of an item having an identified context, context-related information can be generated or retrieved to provide a user with additional helpful data as part of post-OCR-processing. For example, if the Optical Character Recognized (OCR'd) text of a menu is displayed in a user interface (UI) on the user's smartphone, and the text has been identified as a beverage on a menu, apps that may interest the user, such as ratings of certain drinks, can be transmitted from a server to the smartphone for display as part of the UI.

Performing OCR against a frame such as a still image or a frame of a video stream can be challenging due to variations in image quality. Sub-optimal environmental and device limitations such as glare, skewed text, occluded text, and economical camera hardware are factors, which can negatively impact overall OCR accuracy. Some conventional OCR engines have a substantial error rate when processing images with such issues. This is often because conventional OCR engines are focused on recognizing characters from more ideal image sources like a flatbed scanner rather than a camera feed, for instance, from a mobile device. Also, some conventional OCR processing incorporates general language modeling using large reference data sets. For example, text can be compared with an English language dictionary with nearly all of the words in the English language as part of conventional OCR processing.

In some of the disclosed implementations, a client device such as a camera-enabled smartphone or other mobile device equipped with a camera captures frames of image data as still images or as a video stream, for instance, by a user aiming the device at a scene and snapping digital photos or recording video of the scene. As frames are captured, the client device can send the frames to a server device configured to recognize text in each frame by performing OCR on the data of each frame to generate OCR'd text for the frame. The server can send the OCR'd text of each frame back to the client for additional processing and presentation to the user, for instance, in a UI on a display of the client device.

In some of the disclosed implementations, when a server receives a frame of image data from a client, the server can identify a context from an entity in the image, for instance, by performing scene classification or product matching. After performing one or the other, a server implementing an OCR engine can perform OCR processing. In some instances, scene classification or product matching can again be performed on the OCR'd text output by the OCR engine to boost context identification accuracy, for instance, to improve the likelihood that the context is a menu, book, etc. There can be a higher confidence associated with a specific dictionary of words corresponding to the identified context. For example, one context-specific dictionary may have words all relating to a type of a menu, another dictionary may have words related to a newspaper, another may have words that all relate to a dishwasher, etc. After a context is identified, one or more corresponding dictionaries can be selected.

OCR can be performed at one or more different stages of the disclosed techniques, as explained in greater detail below. Scene categorization in terms of identifying a context can be performed by analyzing a frame to determine what type of entity is included in the image data. Examples of scene categories include: products such as menus, maps, newspapers and books; documents; screen captures; billboards; and various services. In some implementations, such categories can be used to compare likelihoods of competing OCR character or word candidates and identify the candidate with the greatest likelihood.

In some aspects, a robust set of dictionaries each having words that often occur in the context can be maintained. For example, a menu is likely to have words, phrases, grammar, and format specific to menus. Words can include "entrees", "price", "appetizer", and so on. During the OCR process, multiple candidates can be identified for each an item being processed. In some implementations, one of any number of candidates can be selected using a context-specific dictionary. Certain words appearing in the context-specific dictionary can have higher confidence. Thus, the OCR processing could involve selecting "appetizer" from the dictionary as having a higher likelihood when recognizing a certain character sequence. In some other implementations, in a post-OCR processing stage, when a context in the form of a scene category has been identified, a trusted set of words in a dictionary linked with that category can be used to automatically correct OCR'd text.

In some implementations, as mentioned above, additional frames are analyzed to increase the likelihood of identifying the right context using an entity in a given frame to improve results and user experience. For example, instead of discarding frames before a given frame in a video stream, a specified number of the most recent frames can be stored and used as a reference for recognizing text in the given frame. Information in the stored frames can be used to better classify the context of the text to further improve accuracy and enhance the user's post-identification experience.

FIG. 1 shows an example of a system 100 in which text in frames of image data can be recognized using contextual information, according to some implementations. In FIG. 1, a mobile device in the form of a smartphone 104 including a camera 108 is carried by a user. The smartphone 104 is one example of various types of devices, which can be used in conjunction with the techniques disclosed herein. For example, as an alternative to a smartphone, the user's device can be a wearable display device, a tablet, a laptop, or a desktop computer system. In this example, smartphone 104 includes an antenna 112 in wireless communication with a plurality of servers 116 via a network 120. Those skilled in the art should appreciate that network 120 can be in the form of any number of networks combined to provide communication between servers 116 and any number of client devices, such as smartphone 104. In FIG. 1, network 120 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

In FIG. 1, the user can point camera 108 of smartphone 104 at any of various scenes including physical objects such as a menu 150. The camera 108 of smartphone 104 is operable to capture snapshots of scenes as frames, for instance, when the user presses a selection on a touch screen 128 of smartphone 104. The captured image can be binarized, for example, to provide image data of each frame. In this example, the binarization is performed by smartphone 104 to generate frames 132a-132N of digital image data.

In other examples, smartphone 104 is configured to shoot video of scenes using camera 108. In some other examples, smartphone 104 is capable of receiving streamed video over network 120. In such examples, frames 132a-132N are frames of such video data. The disclosed techniques are applicable to both live camera feeds as well as clusters of still images captured by taking individual snapshots of a scene. Also, in some implementations, frames of image data are captured automatically by smartphone 104, that is, without user input causing snapshots or video to be captured.

In FIG. 1, a user has walked into a restaurant, "Juan's Taqueria". The user has decided to point camera 108 at menu 150 upon sitting down at the restaurant. As shown in FIG. 1, menu 150 has various food item categories such as "Tacos", "Burritos", "Sides", etc. The user is interested in capturing text of part or all of menu 150 for any of various reasons such as emailing a friend a list of food items and prices or accessing a website with reviews of Juan's and of particular food items at Juan's. In this example, the user points camera 108 at an upper left region 154 of menu 150 and snaps a digital photo, thus generating frame 132a. The user then aims camera 108 at an upper right region 158 of menu 150 to capture frame 132b. One or more of the various textual items and other entities in menu 150 can be captured in such a manner. In another example, the user records video of the menu to generate frames 132a-132N including one or more items of a scene of interest.

In FIG. 1, as soon as a frame 132a has been captured by smartphone 104, smartphone 104 can transmit frame 132a to any of servers 116. As additional frames 132b-132N are captured, these frames can be separately transmitted from smartphone 104 to servers 116. The servers 116 are configured with OCR processing engines to perform OCR on frames of image data received from devices such as smartphone 104. In some implementations, servers 116 are also configured to perform error correction on OCR'd text from a frame. In FIG. 1, by way of example, an OCR processing engine has OCR'd frames 132a and 132b to produce OCR'd text 134: "Tomatoes", "Tacos" and "Pascabo". The servers 116 are configured to filter OCR'd text 134 using context-specific dictionaries as disclosed herein to identify text 136, in which "Tomatoes" has been changed to "Tamales", as appearing in region 154 of menu 150, and "Pascabo" has been changed to "Pescado" as appearing in region 158 of menu 150. The identified text 136 can be sent from servers 116 back to smartphone 104 as soon as such text 136 is identified, as shown in FIG. 1. The smartphone 104 has one or more processing modules, for example, in the form of a CPU 140 configured to perform additional processing on identified text 136 from servers 116.

In some implementations, servers 116 are stateless. One or more of servers 116 are configured to perform OCR as well as context-specific filtering as soon as the frame is received and immediately return identified text 136 as a result to a client device, which sent the frame to the server. In some implementations, smartphone 104 transmits frames 132a-132N to servers 116 for processing as soon as each frame is available to be sent. That is, in some implementations, the client device does not wait for results of a first frame such as frame 132a to be returned before transmitting a second frame, such as frame 132b. By the same token, the client device does not need to wait for results before taking additional snapshots of a scene and transmitting frames of those snapshots to servers 116 for processing. Thus, the sending of frames 132a-132N and the receiving of identified text 136 between smartphone 104 and servers 116 are asynchronous, in the example of FIG. 1. A client device such as smartphone 104 listens for and processes text 136 asynchronously with respect to sending frames 132a-132N.

Figure 2:
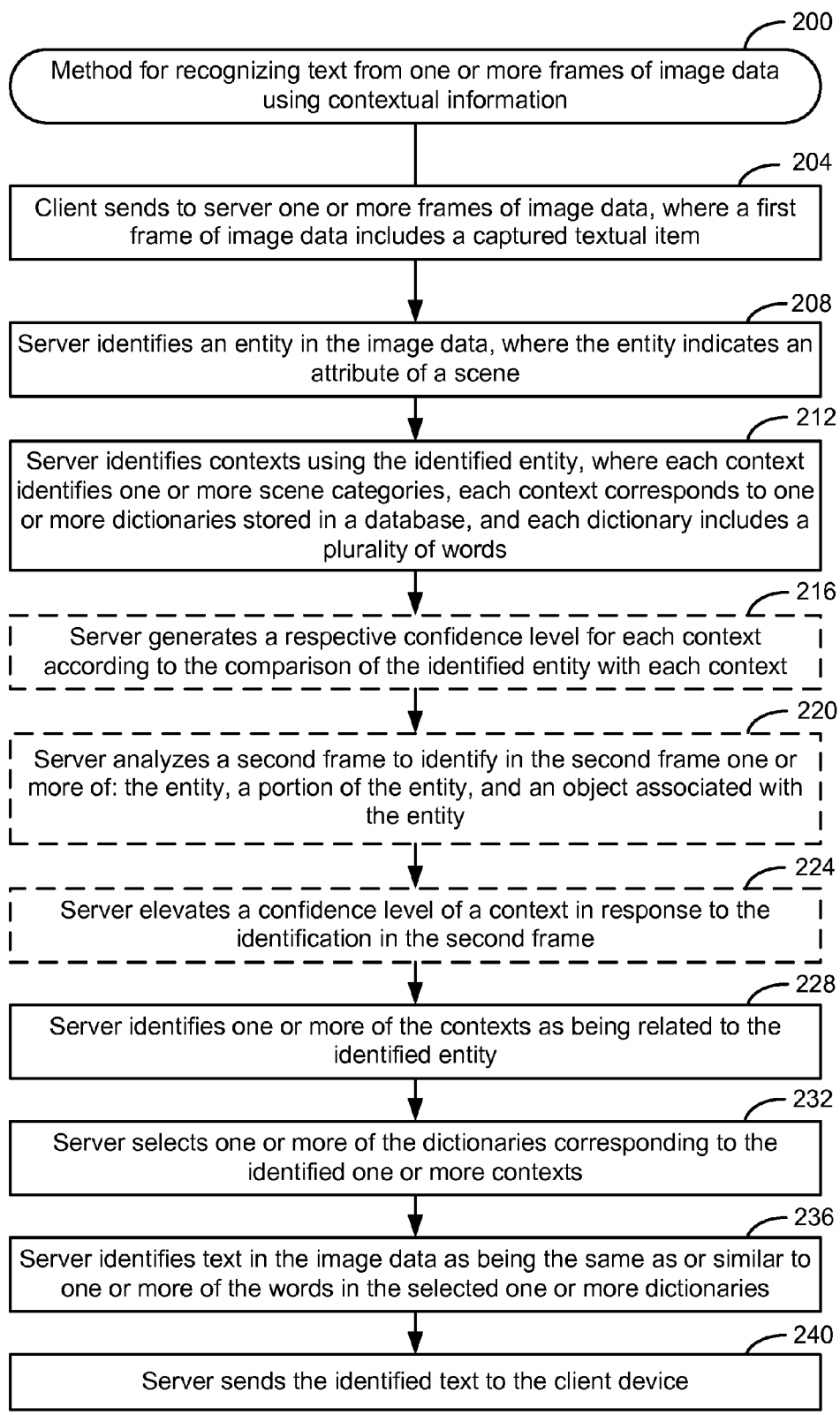
FIG. 2 shows an example of a method 200 for recognizing text from one or more frames of image data using contextual information, performed according to some implementations.

FIG. 2 shows an example of a method 200 for recognizing text from one or more frames of image data using a context, performed in accordance with some implementations. While not shown, in some implementations, method 200 can be adapted to include one or more pre-processing stages, that is, before operations described below at 204, 208, etc. are performed. Pre-processing can include frame selection to identify one or more frames of a larger set that accurately depict text of interest or objects including text of interest. That is, frames are desirably selected that are sufficiently clear. For example, in FIG. 1, smartphone 104 can be configured to select frames based on quality, for instance, using parameters such as focus, contrast, etc. A processing engine implemented by CPU 140 of smartphone 104 can automatically select frames based on such parameters. In some other implementations, frames are selected manually, for example, by a user tapping on selected frames displayed on display 128. In such implementations, frames 132a-132N transmitted to servers 116 would include only the selected frames. These frame selection techniques can be applied to both sequences of still images, as well as video streams of text in scenes being captured by camera 108.

In FIG. 2, at 204, a client device such as smartphone 104 of FIG. 1 is configured to send one or more frames 132a-132N to one or more servers 116 via network 120 for OCR processing of a textual item captured using camera 108 as described above. For instance, in the example where frame 132a is a digital representation of region 154 of menu 150, textual items such as "Juan's", "Lunch", or "Tamales" have been captured as part of frame 132a. By the same token, in frame 132b, only the "acos" portion of the word "Tacos" has been captured. Also in frame 132b, only the "ueria" portion of "Taqueria" has been captured.

In FIG. 2, at 208, one or more of servers 116 is configured to identify an entity in the image data of a given frame. The entity identified at 208 can take various forms (including text, icons, drawings, pictures, photographs, and the like) and generally indicates an attribute of a scene captured to generate the given frame. For example, in FIG. 1, when processing frame 132b, entities such as the word "Pescado" and characters such as "a", "c", "o", and "s" of the word "Tacos" are characters which can be identified at 208. Another example of an entity identified from frame 132b includes the illustration of a taco 162 in region 158 of menu 150. Various entities such as characters, words, phrases, images, etc. can be identified in a frame at 208. In such examples, the entity serves as an attribute of a scene captured to generate the frame. In other examples, attributes such as the structure of a document or a formatting of text in the scene can be identified. Thus, in the example of menu 150 in FIG. 1, the sub-headings of "Sides", "Tacos", and "Burritos" can be identified as attributes of a digital image of menu 150. By the same token, the font or font size of words or right-justification of prices of food items listed under a given sub-heading are attributes of menu 150 that can identified at 208.

At 208, in some implementations, entities and attributes of a scene represented by a frame of image data can be identified using available scene identification processes without performing OCR. In some other implementations, the identification of entities at 208 can be practiced by performing OCR on the frame. The latter can be desirable, for example, in situations where OCR'd text from a frame is to be used for later processing in some implementations of method 200, such as scene classification.

Figure 3:
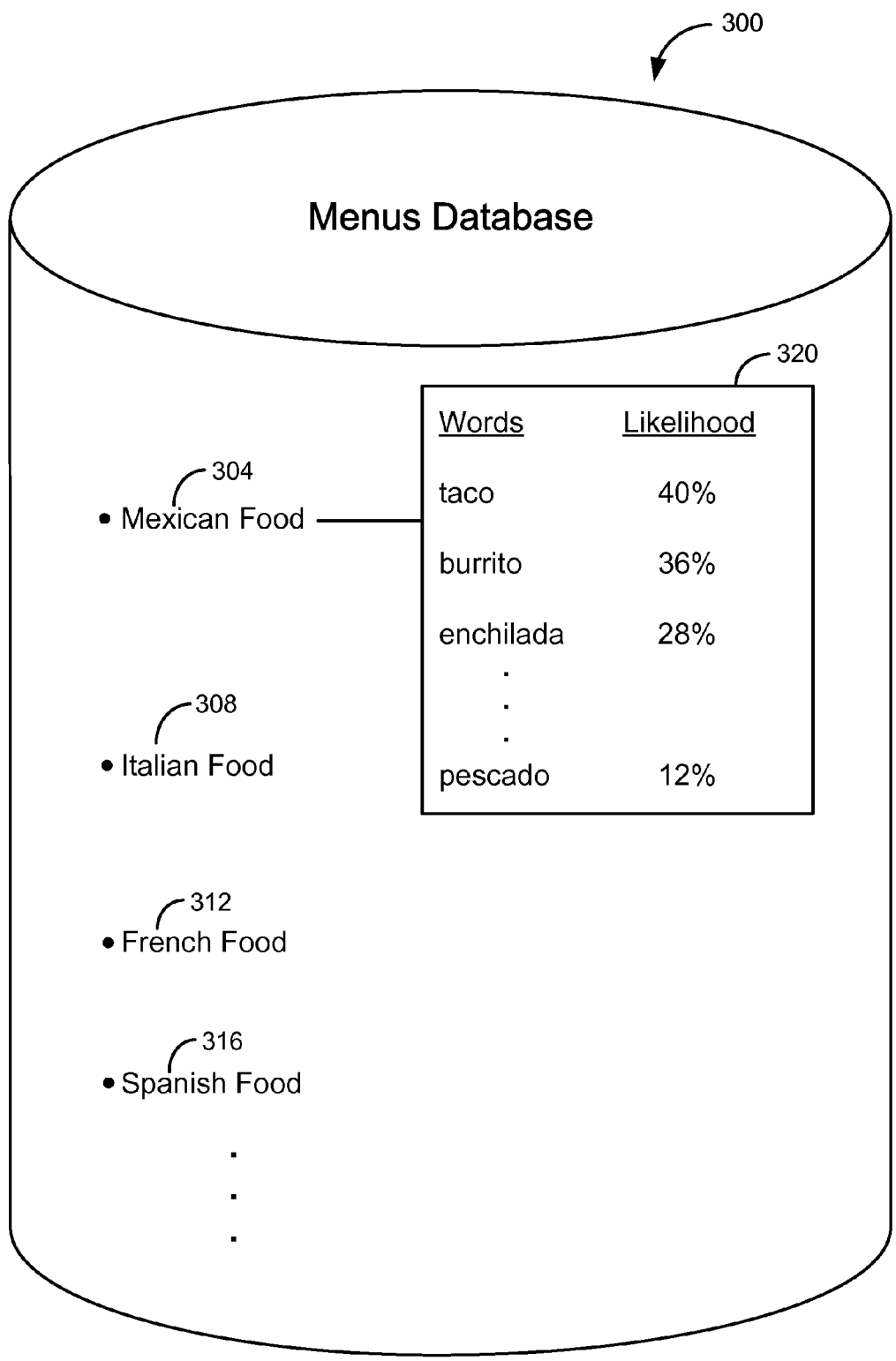
FIG. 3 shows an example of a database 300 storing contexts and corresponding word dictionaries, according to some implementations.

In FIG. 2, at 212, a server is configured to use the identified entity from 208 to identify any number of contexts. In the example of FIGS. 1 and 2, each context identifies one or more categories of scenes. Contexts can be formatted and organized in a database for look-up at 212, for example, in rows of an appropriate database table. For example, in FIG. 1, a menus database 300 is structured as illustrated in FIG. 3 to include contexts identifying categories of food that can appear in a menu such as "Mexican Food" 304, "Italian Food" 308, "French Food" 312 and "Spanish Food" 316. In FIG. 3, each context 304-316 is situated in a database table with a pointer to a database object in the form of a dictionary storing words related to the given context. For example, context 304 points to a dictionary 320 storing words often used in the context of Mexican food. Words such as "taco", "burrito", "enchilada", and "pescado" are stored in dictionary 320. Other various contexts 308-316 can each have an associated context-specific dictionary of words related to that context similar to dictionary 320.

Those skilled in the art should appreciate that a classifier can be trained on a sufficiently large data set to identify certain structures and/or words, characters and any associated formatting as more likely to be menus than other categories of databases in a database system 166, as shown in FIG. 1. For example, based on the formatting of text, such as sub-headings with left-justified food items and corresponding right-justified prices, as in menu 150, a machine learning classifier can be trained to classify such attributes as more likely linked with menus database 300 as opposed to a services database 170 or a products database 174. Thus, such classifiers can be adapted to perform one or more aspects of scene recognition for the purposes of operations 208 and 212 of method 200.

In some implementations, contexts identified in one or more databases in system 166 of FIG. 1 can information about images that frequently appear in the context. For example, in an alternative implementation of menus database 300, contexts include graphical representations of various types of food items. Thus, for example, an image of a taco or a burrito stored with a context is more likely to be identified as being associated with taco illustration 162 of menu 150 as opposed to an image of waffles. In some implementations, a dictionary linked with a given context can also include images stored as "words" in rows of a database table to compare with possibly similar images appearing in a frame of image data.

In one example of using images with contexts, products database 174 in FIG. 1 can be structured to have different types of product images stored with contexts. Thus, when a client device such as smartphone 104 snaps a digital photo of a product in a scene, part or all of an entity captured in the photo can be identified by a server and compared with images stored in products database 174. For example, a digital photo of a popular novel having a certain color, pattern, font or other indicia serving as an attribute at 208 of FIG. 2 can be processed to compare the identified entity or attribute with images of various products. Thus, the identified entity from the frame can be matched with a product image in database 174 having the same or similar attributes. In such implementations, as an alternative or in addition to performing scene classification using a machine learning classifier as described above, contextual association with identified entities can be performed through image matching. In such implementations, objects or portions of objects captured in any scene such as a pre-packaged food product, a computing peripheral, a home appliance, or a baby stroller can be compared and matched with a product image serving as a context in products database 174. Thus, when a context-specific dictionary associated with the matched product image is accessed, further comparisons can be performed to identify more details about the identified product. In the example of products database 174, dictionaries can be in the form of product information records each identifying particular details in the form of words, which characterize the identified product.

In the example of a frame of image data in which part or all of a book cover was captured, the book cover may contain text in a difficult-to-read font, which would reduce the accuracy of any OCR performed on that text. The image of the book cover can be matched with the closest image serving as a context in products database 174, where the context identifies a specific edition of a specific book. Thus, a context-specific dictionary storing bibliographic data of the particular edition of the book can be accessed, that is, where the words in the dictionary are items of bibliographic data and any other relevant product information about the particular book. For example, the author and title, stored as words in the context-specific dictionary, can be known with a high degree of likelihood or confidence. Thus, any text in the captured frame that is recognized and is similar to but not identical to the author's name or book title stored in the dictionary can be assumed to be that author and title, and then corrected accordingly using techniques described below. The subset of words in the context-specific dictionary linked with a particular product image can include additional relevant data such as the publisher name, any Uniform Resource Locators (URLs) identifying information about the specific edition of the book, subtitles, online reviews, and other various attributes of a product. Thus, product image matching performed as one example of operations 208 and 212 of method 200 can result in the access of a focused and limited set of highly relevant words including helpful data such as brand, slogan, and the attributes described above to increase accuracy rates when OCR processing is performed.

Those skilled in the art will appreciate that the various databases in system 166 of FIG. 1 and the inclusion, arrangement, updating and management of contexts and associated dictionaries can be carried out in various manners. Any number of techniques can be performed to gather and store information specific to a context in the form of a context-specific dictionary as described above. For example, in the case of menus database 300, any number of online menus can be identified and processed to generate a list of words occurring across the various menus or menu types linked with identifiable cuisines. As words occur more than once across any number of menus, the relative occurrence of those words can be calculated and stored as likelihoods, for example, in dictionary 320 of FIG. 3. Thus, when a menu is identified as the context of entity scene, as explained above, the appropriate context-specific dictionary can be retrieved to provide a relevant set of words and associated likelihoods ordinarily occurring in the identified context.

Next, operations 216, 220 and 224 of method 200 in FIG. 2 will be described. These operations can be omitted in some implementations. At 216, in some implementations, a server can generate a confidence level for each context according to the comparison of the identified entity with each context stored in a database. Returning to the example of FIGS. 1 and 3, when a taco illustration 164 is matched with a similar taco image stored as a context in menus database 300, the confidence level can be relatively high when compared with the confidence generated by comparing taco illustration 164 with an image of scrambled eggs. Thus, the stored taco image in database 300 associated with Mexican food in database 300 can be selected as the context with the higher or highest confidence level. In some other implementations, confidence levels associated with any of various contexts can be compared with a threshold, such that only a context or contexts satisfying the threshold are selected as matches with an entity in a frame of image data.

In some implementations, at 220, to boost the confidence level of one or more contexts identified as likely matches with an entity in a frame, one or more additional frames in a sequence can be analyzed. For example, in FIG. 1, a sequence of frames 132*a*-132N is transmitted to servers 116. In addition to frame 132*a* being processed as described above, frame 132*b* can be similarly processed to identify the same entity or a portion of the same entity, or in some cases, a different entity such as an object appearing in the frame. When the entity or portion of an entity identified at 220 is processed in similar manner as the entity identified in frame 132*a* at 212, and one or more of the contexts having a sufficiently high confidence level at 216 also match the entity in frame 132*b*, at 224, the confidence level of the identified context can be elevated or weighted accordingly. Those skilled in the art should appreciate that, when operation 220 is performed, any additional frame in a sequence of frames can be processed, including frames preceding or following the first frame processed at 204 of method 200.

In some implementations, in addition or as an alternative to the processing of a second frame of image data at 220, additional parameters can be processed by a server to boost the confidence level of an identified context. For example, geolocation coordinates of smartphone 104 can be transmitted from smartphone 104 to a server and processed to identify on a map what businesses or other places of interest are within a designated geographic radius of the coordinates. For example, the restaurant, Juan's Taqueria, can be identified as being within 0.1 miles of smartphone 104. Such additional parameters can be used to identify Mexican food as a more likely context to be associated with in the scene corresponding to frames 132*a*-132N.

In FIG. 2, at 228, any context(s) are determined, for instance using an identified entity or using confidence levels as described above at operations 216-224. Thus, at 232, any dictionary or dictionaries corresponding to the identified contexts at 228 can be selected. In the example of FIGS. 1 and 3, when Mexican food 304 has been identified as a context using any entities appearing frame 132*a* or 132*b*, dictionary 320 can be selected. In addition, in some implementations, one or more further dictionaries linked with Mexican food 304 in a database system can be retrieved.

In FIG. 2, at 236, when a dictionary is retrieved, a server can compare text appearing in the image data of a frame with the words in the dictionary. Thus, any words which are the same as or similar to the text can be selected. The use of different contexts before comparing text to words can increase accuracy by selecting a dictionary such as Mexican food dictionary 320 of FIG. 3 containing a limited set of words related to Mexican food menus, to inform a decision among sometimes multiple alternate candidates of recognized text and select the most likely candidate. In the example of FIGS. 1 and 3, when a Mexican food menu has been identified as the context for frame 132*a*, for example, scene-specific words in dictionary 320 can serve as a scene-specific language model to provide candidates to match with text in the frame.

In FIG. 2, at 236, OCR is performed to identify text in image data of a frame, in some implementations. For instance, it can be desirable to postpone any OCR processing of method 200 until after a context and related dictionary have been identified and selected at 228 and 232 of method 200. In some implementations, scene-specific words appearing in a dictionary such as dictionary 320 of FIG. 3 can be used to spell-correct OCR processing output towards that limited set of words, which are considered trusted since they appear in a dictionary matching an identified context. Correction of individual characters in such a manner is further described below in relation to the example of FIG. 4.

In FIG. 2, at 236, in some implementations, identification of text in image data of a given frame includes performing OCR on the image data using an OCR model having words of a selected dictionary corresponding to an identified context, such as the words of dictionary 320 corresponding to the matching context of Mexican food 304. In such implementations, one or more words of the dictionary can be selected as part of the OCR processing according to the relative likelihoods of those words stored in dictionary 320 or in another record associated with dictionary 320. Thus, as part of the OCR processing, a textual string such as "acos" in region 158 of menu 150 in FIG. 1 would likely be matched with the word, "Taco", as having a higher likelihood than other words in dictionary 320.

In some other implementations, when performing OCR processing at 236 of FIG. 2, any dictionary or words in a dictionary corresponding to an identified context are not used, and OCR is performed using a general language model with a much larger set of words than a context-specific dictionary stored in one of the databases in system 166 of FIG. 1. In such implementations, when a more generalized OCR process is implemented at 236, the use of words in an appropriate dictionary related to an identified context can be postponed and used in a post-OCR processing correction stage, in which any recognized text output from a general OCR processing engine is corrected using words of the selected dictionary. Thus, relative likelihoods of words in a dictionary can be used during this post-processing stage rather than at 236 as described above. In such implementations, OCR processing using a general language model can be enhanced by a correction stage in which any OCR'd text is boosted by application of a context-specific dictionary. When the output of such a post-processing correction stage is different than the OCR'd text from operation 236, it can be assumed that the corrected output is more accurate since the processing of method 200 has identified a scene-specific context for a frame, such as a Mexican food menu in the example of FIGS. 1 and 3. The context-filtered result can then be further processed in any number of ways, including transmission of the result to a client device such as smartphone 104 for display to the user on display 128, at 240 of FIG. 2.

In some other implementations, OCR'd text using a generalized dictionary can result in a set of words, a majority or threshold number of which appear in a context-specific dictionary. For example, in FIG. 1, when general OCR processing is performed on frames 132*a* and 132*b*, 15 of 20 OCR'd words describe Mexican food items and appear in dictionary 320 of FIG. 3. Since the majority of OCR'd words appear in dictionary 320, dictionary 320 can be selected to perform context-specific filtering of the OCR'd words. Thus, in some implementations, OCR'd text using a general language model can be used to select a context or a context-specific dictionary for further processing, such as error correction, of the OCR'd text.

In FIG. 2, at 240, in some implementations, a highest likely candidate of a word in a dictionary matching text in a frame is sent to a client device for display to a user. In some other implementations, more than one candidate having a sufficiently high likelihood is sent to a client device for display, with a prompt requesting the user to choose one of the candidates. By performing some of the disclosed techniques, a smaller set of more relevant OCR candidates can be presented to a user.

Figure 4:
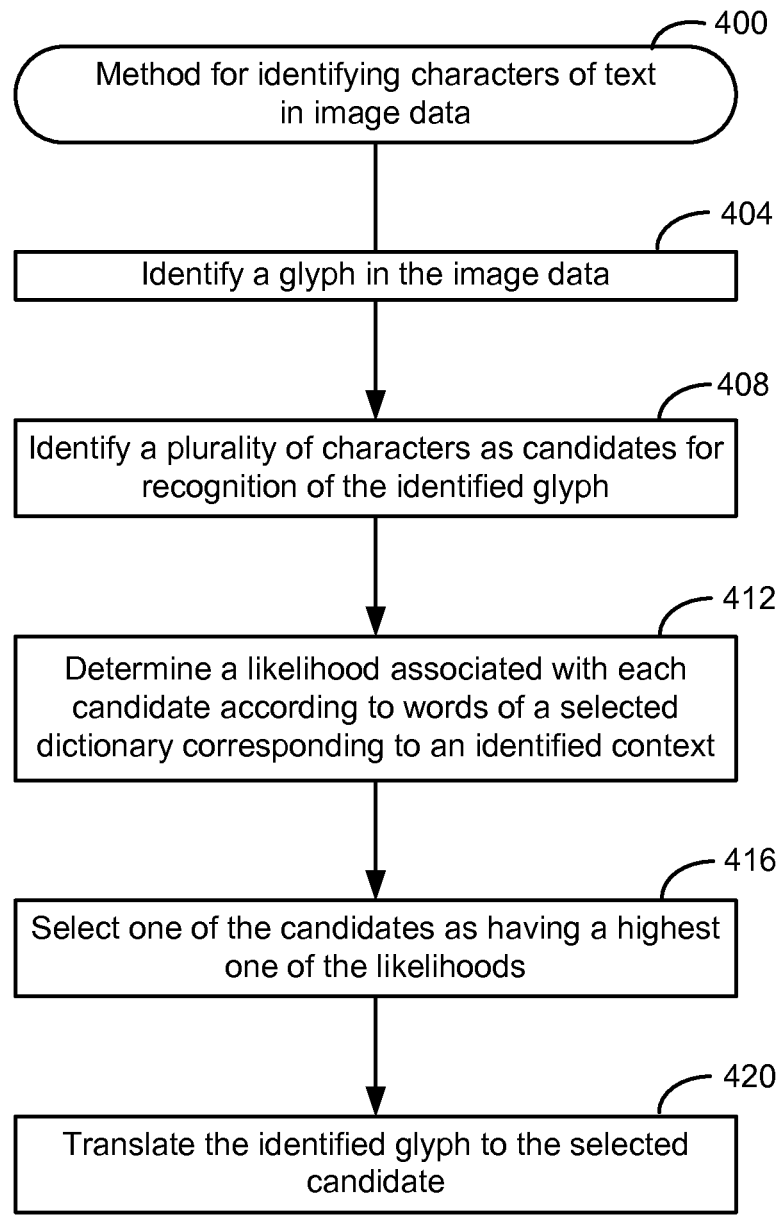
FIG. 4 shows an example of a method 400 for identifying characters of text in image data, performed according to some implementations.

FIG. 4 shows an example of a method 400 for identifying characters of text in image data, performed according to some implementations. In FIG. 4, method 400 can be practiced, for example, as part of the identification of text at 236 of method 200. In some other examples, as mentioned above, method 400 can be practiced after operation 236 as part of a post-OCR processing correction stage. At 404, a glyph in the image data of a frame is identified. At 408, one or more characters are identified as candidates for recognition of the identified glyph of operation 404. For example, as part of OCR processing, there can be multiple possible characters serving as candidates to possibly match with a given glyph. For example, an "o" or "a" can be reasonably likely candidates to match with an "e" appearing in image data because those characters share some general structure. Thus, method 400 provides a technique for assigning helpful likelihoods to possible candidates to make a more informed identification.

In FIG. 4, at 412, a likelihood can be determined for a given character candidate using the words of a selected dictionary corresponding to a context identified, for example, at 228 of method 200. Thus, in the example of FIGS. 1 and 3, the "e" in the word, "Pescado" in region 158 of menu 150 can be correctly recognized using "pescado" appearing in dictionary 320. That is, for example, when the "P" and "p" of the words have been matched, an "e" would have a higher likelihood as being the next character in the string as opposed to an "o" or "a".

In FIG. 4, after determining respective likelihoods of any candidates at 412, the candidate having the highest likelihood can be selected at 416 so that, at 420, the glyph identified at 404 can be translated to the selected candidate.

Figure 5:
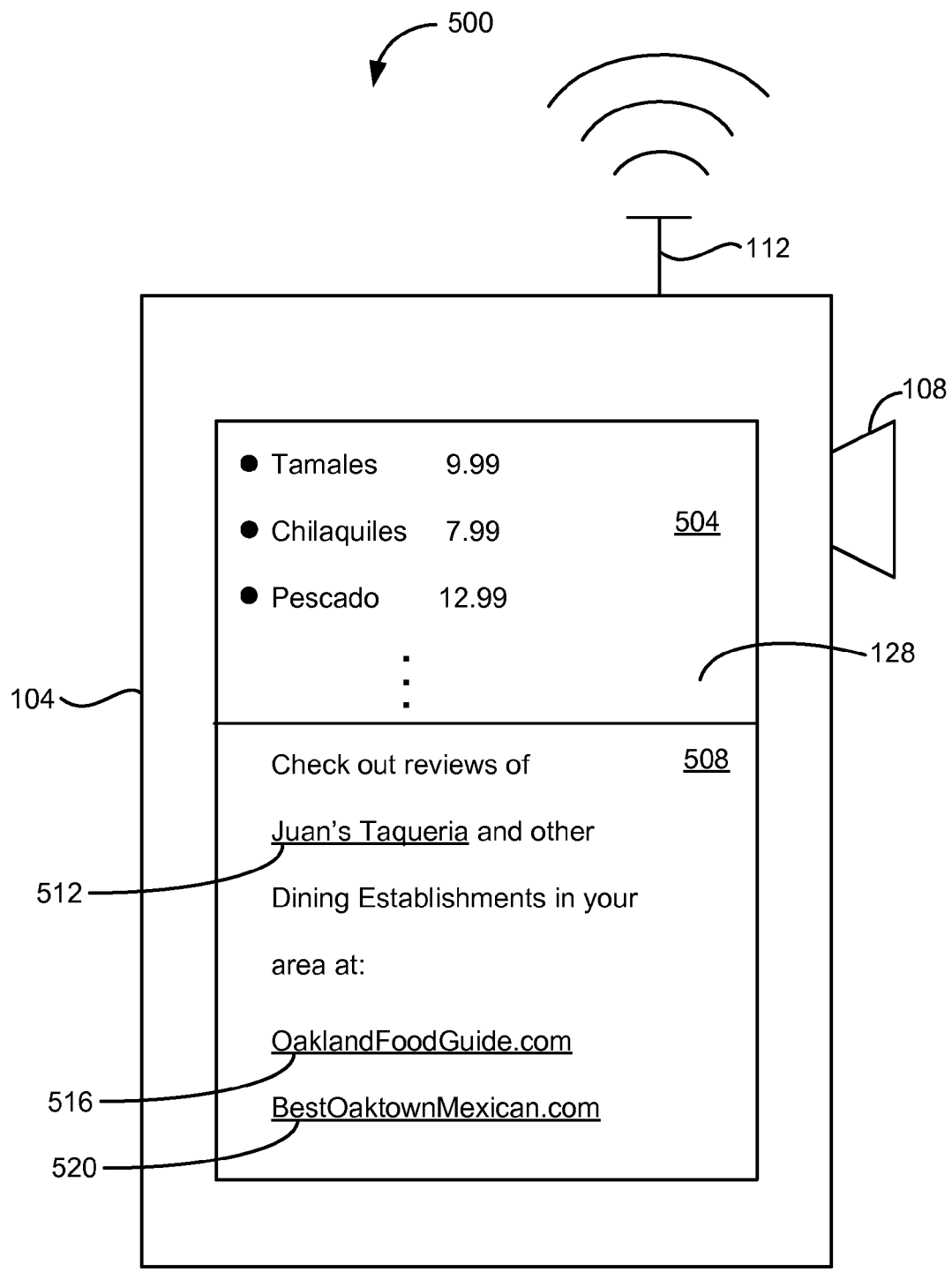
FIG. 5 shows an example of a display state 500 on a user's device showing identified text and related data, according to some implementations.

FIG. 5 shows an example of a display state 500 on a user's device such as smartphone 104 showing identified text and related data, according to some implementations. In FIG. 5, as shown on display 128, identified words appearing in one or more frames of image data captured from menu 150 of FIG. 1 are displayed in an upper region 504 of a UI. These words include "Tamales", "Chilaquiles" and "Pescado" appearing in regions 154 and 158 of frames 132*a* and 132*b*, as described above. OCR processing has also identified the corresponding prices of these food items as appearing on menu 150.

In some implementations, data related to any identified text in the form of results displayed in region 504 can be retrieved by a server and delivered to a client device such as smartphone 104 to facilitate user action in response to the recognized text. For example, in region 508 of the UI in display 128 of FIG. 5, in response to recognizing the name of the restaurant as "Juan's Taqueria", a server can automatically generate and display a link to a website maintained on behalf of Juan's Taqueria accessible through a hyperlink to the restaurant website displayed in region 508. In this example, one or more servers are configured to also generate links to URLs providing additional information related to restaurants such as Juan's Taqueria. Thus, in the example of FIG. 5, a server has transmitted actionable links 516 and 520 to websites, both of which providing reviews of restaurants relevant to Juan's Taqueria, in this example.

Various types of computing events that can be caused to occur by tapping or otherwise selecting an actionable text item displayed on display 128 include generating a social network post to a user or group of a social networking system as referenced by the displayed text, generating a text message to a person or phone number identified by the displayed text, and generating an instant message (IM) to be sent to a user identified by the displayed text using appropriate channels.

In some implementations, for example, as part of operation 220 of FIG. 2 or a post-OCR processing stage, additional scene information can be used to enhance text recognition using the disclosed techniques. For example, as mentioned above, when the same entity or at least a portion of the same entity such as a textual item appears in a previous or later frame in a sequence, that information can be processed, for example, by comparing information in the previous or later frame with contexts and words in corresponding dictionaries of a database in system 166 of FIG. 1. For example, one frame may contain multiple phone numbers but omit icons or textual labels denoting that certain phone numbers are mobile numbers while others are home phone numbers. In other instances, the icons or labels are blurry and, thus, cannot be identified. In some implementations, such omitted or obscured information can be reconstructed using additional frames such as previous or later frames in a sequence. Thus, the individual numbers in a string can be recognized more accurately or corrected after performing OCR when it is known that the string is a phone number as opposed to English words, or when the string is known to be a person's mobile as opposed to an office phone number, by way of example. In one example, when a phone number is identified as a home number, geo-location data of the user's device can be used to correct an area code. However, when a phone number is recognized as a mobile number, it may be desirable to not use geo-location data, since many users have mobile numbers with area codes, which do not match an area in which they work or travel frequently.

In some implementations, additional scene information from previous or subsequent frames can include different entities or objects apart from and in addition to an entity being processed in a given frame. For example, in FIG. 1, a frame capturing part or all of menu 150 may also include a portion of a bar, a sign, artwork, and other objects in Juan's Taqueria in a proceeding or following frame. In such instances, such an object or additional entity can cause the category of a sign rather than a menu to be selected. However, when objects or further entities in a different frame in a sequence include plates or silverware, the frame can be more likely categorized as being a menu. When a category for a scene is determined, corresponding dictionaries as described above can be retrieved from an appropriate database to perform contextual recognition with higher accuracy.

In some implementations, as part of post-OCR processing, identification of objects and different entities in other frames can be used to determine and provide appropriate actions relevant to a user. For example, two phone numbers may be included in a given frame, and a textual entity in an earlier frame identifies one phone number as a mobile number and the other as a fax number. In such an example, the mobile number can be presented on a display to the user as an actionable item, which the user can tap to cause his device to dial the number. However, since the other phone number was identified as a fax number, the fax number can be omitted from the display or displayed without being actionable.

In another example, when one frame identifies part or all of a recognizable street address, and a previous frame includes additional entities such as the name of a real estate agent, a selectable URL to a website providing real estate listings can be generated and delivered to the user's device for display, so a user can tap on the displayed website to access real estate listings. In this example, since the device captured a real estate agent's name, it can be assumed that the address is a property for sale. A URL providing the address as an input to a real estate listing application or cloud-based service can be generated and displayed on the user's device. Thus, relevant data including links to websites and executable applications can be provided for the user to act on.

In some implementations, a user's device can be configured, in some cases, when instructed by a server, to automatically capture frames of image data before or after a user presses a button or otherwise takes an action on the user's device to capture still images or video. For example, a smartphone can be configured to detect motion, for instance, using a gyroscope or other motion sensing hardware in the smartphone to begin capturing frames of image data as a user moves and orients a camera on the smartphone to be aimed at an object. In such instances, the user's device can be configured to automatically capture frames before the user stabilizes the device and snaps a photo. By using previous and/or later frames than those intentionally captured by a user, accuracy can be improved. For example, if a textual string in a current frame is truncated, the entire string may appear in a previous frame, which can be used to enhance scene classification accuracy.

It should be noted that, despite references to particular computing paradigms and software tools herein, computer program instructions on which various implementations are based may correspond to any of a wide variety of programming languages, software tools and data formats, and be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols herein are merely by way of example. Suitable alternatives known to those of skill in the art may be employed.

Any of the components, modules, engines and operations described herein may be implemented at least in part as software code to be executed by a processor using any suitable computer language such as Java, C++ or Perl, by way of example only. The software code may be stored as a series of instructions or commands on a computer-readable medium for storage and/or transmission. Suitable computer-readable media include random access memory (RAM), read only memory (ROM), a magnetic medium such as a hard-drive or a floppy disk, an optical medium such as a compact disk (CD) or DVD (digital versatile disk), flash memory, and the like. The computer-readable medium may be any combination of such storage or transmission devices. Computer-readable media encoded with the software/program code may be packaged with a compatible device such as a client device or a server device as described above or provided separately from other devices. Any such computer-readable medium may reside on or within a single computing device or an entire computer system, and may be among other computer-readable media within a system or network. A computing device such as the client devices described above may include a monitor, printer, or other suitable display for providing any of the results mentioned herein to a user.

While the subject matter of this application has been particularly shown and described with reference to specific implementations thereof, it will be understood by those skilled in the art that changes in the form and details of the disclosed implementations may be made without departing from the spirit or scope of this disclosure. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope should not be limited by reference to such advantages. Rather, the scope should be determined with reference to the appended claims.

What is claimed is:

1. A non-transitory computer-readable storage medium storing instructions executable by one or more processors of a server to cause a method to be performed for recognizing text from one or more frames of image data, the method comprising:
   receiving, from a device in communication with the server via a network, image data including a captured textual item, the image data corresponding to at least a portion of a first frame of video data;
   identifying an entity in the image data;
   identifying a plurality of contexts using the entity, each context identifying one or more of a document, a product, or a service, each context corresponding to one or more of a plurality of dictionaries stored in a database;
   generating a respective confidence level for each context according to a comparison of the entity with each context of the plurality of contexts;
   identifying one or more contexts of the plurality of contexts as being related contexts to the entity, the respective confidence level for each related context of the related contexts satisfying a threshold;
   selecting one or more of the dictionaries corresponding to the one or more related contexts;
   determining an identified text in the captured textual item using the selected one or more dictionaries; and
   sending the identified text to the device.

2. The non-transitory computer-readable storage medium of claim 1, wherein identifying the text in the captured textual item comprises:
   identifying a glyph in the captured textual item;
   identifying a plurality of characters as candidates for recognition of the glyph;
   determining a likelihood associated with each candidate according to words of a selected dictionary corresponding to one or more of the related contexts; and
   selecting one of the candidates as having a highest one of the likelihoods.

3. The non-transitory computer-readable storage medium of claim 1, wherein the one or more contexts comprise a type of object, a type of a product, or a menu for a type of cuisine.

4. The non-transitory computer-readable storage medium of claim 1, wherein the entity comprises one or more of text, an icon, a drawing, a picture, or a photograph.

5. One or more server devices comprising:
   one or more processors operable to:
      receive, from a client device in communication with a server device via a network, image data including a captured textual item;
      identify an entity in the image data;
      identify one or more contexts using the entity;
      generate a confidence level for a context of the one or more contexts;
      select the context from the one or more contexts, the confidence level satisfying a threshold, the context corresponding to a dictionary;
      identify a first text in the captured textual item using the dictionary; and
      send the first text to the client device.

6. The one or more server devices of claim 5, wherein the one or more processors are further operable to identify the entity in the image data by:
   performing optical character recognition on the image data.

7. The one or more server devices of claim 5, wherein the one or more processors are further operable to identify the first text in the captured textual item by:
   performing optical character recognition on the captured textual item using an optical character recognition model and the dictionary.

8. The one or more server devices of claim 7, wherein the one or more processors are further operable to perform optical character recognition on the captured textual item using the optical character recognition model by:
   selecting one or more words of the dictionary according to relative likelihoods of the words.

9. The one or more server devices of claim 5, wherein the one or more processors are further operable to:
   identify a second text in the captured textual item without using the dictionary; and
   correct the second text using the dictionary.

10. The one or more server devices of claim 5, wherein the one or more processors are further operable to identify the text in the captured textual item by:
    identifying a glyph in the captured textual item;
    identifying a plurality of characters as candidates for recognition of the glyph;
    determining a likelihood associated with each candidate according to words of the dictionary; and
    selecting one of the candidates as having a highest one of the likelihoods.

11. The one or more server devices of claim 5, wherein the one or more processors are further operable to:
    generate a confidence level for the context; and
    select the context using the confidence level.

12. The one or more server devices of claim 5, wherein the one or more processors are further operable to:
    retrieve data related to the identified text; and
    send the data to the client device.

13. The one or more server devices of claim 12, wherein the data identifies one or more of an application, a cloud-based service, or a website.

14. The one or more server devices of claim 5, wherein the client device is capable of displaying at least a portion of the first text on a display, the at least a portion of the first text being actionable to cause a computing event to occur.

15. The one or more server devices of claim 14, wherein the one or more processors are further operable to:
    receive, from the client device, second image data;
    identify a second entity in the second image data; and
    select the context from the plurality of contexts using the second entity.

16. The one or more server devices of claim 5, wherein context comprises a type of object, a type of a product, or a menu for a type of cuisine.

17. The one or more server devices of claim 5, wherein the image data corresponds to at least a portion of a first frame of video data.

18. A method comprising:
    receiving, at a computing device, image data including a captured textual item;
    identifying an entity in the image data;
    identifying one or more contexts using the entity;
    generating a confidence level for a context of the one or more contexts;
    selecting the context from the one or more contexts, the confidence level satisfying a threshold, the context corresponding to a dictionary;
    identifying text in the captured textual item using optical character recognition and the dictionary; and
    providing the text to a display device.

19. The method of claim 18, wherein the context comprises a type of object, a type of a product, or a menu for a type of cuisine.

20. The method of claim 18, wherein the dictionary includes words corresponding to one or more products.

21. The method of claim 18, further comprising:
receiving second image data; and
wherein selecting the context comprises analyzing the second image data.

22. The method of claim 21, further comprising:
performing optical character recognition on the captured textual item using an optical character recognition model and the dictionary.

* * * * *